US009336105B2

(12) United States Patent
Riley

(10) Patent No.: US 9,336,105 B2
(45) Date of Patent: May 10, 2016

(54) EVALUATION OF MULTIPLE INPUT SIGNATURE REGISTER RESULTS

(75) Inventor: Mack Wayne Riley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 12/895,102

(22) Filed: Sep. 30, 2010

(65) Prior Publication Data

US 2012/0084603 A1 Apr. 5, 2012

(51) Int. Cl.
*G01R 31/28* (2006.01)
*G06F 11/22* (2006.01)
*G06F 11/27* (2006.01)

(52) U.S. Cl.
CPC ............ *G06F 11/2242* (2013.01); *G06F 11/27* (2013.01)

(58) Field of Classification Search
CPC ............... G01R 31/318307; G01R 31/318314; G01R 31/318342; G01R 31/318516; G11C 29/56
USPC ......................................................... 714/742
See application file for complete search history.

(56) References Cited

U.S. PATENT DOCUMENTS

| 4,510,435 | A | | 4/1985 | Tanno |
| 4,835,479 | A | | 5/1989 | Haines |
| 6,158,032 | A | * | 12/2000 | Currier et al. ................. 714/726 |
| 6,393,594 | B1 | * | 5/2002 | Anderson et al. ............. 714/738 |
| 7,155,637 | B2 | | 12/2006 | Jarboe, Jr. et al. |
| 7,181,661 | B2 | | 2/2007 | Bybell |
| 7,206,966 | B2 | | 4/2007 | Barr et al. |
| 7,353,440 | B2 | | 4/2008 | Ohwada et al. |
| 7,627,797 | B2 | | 12/2009 | Miner et al. |
| 7,673,208 | B2 | | 3/2010 | Seuring |
| 7,685,487 | B1 | | 3/2010 | Kuo et al. |
| 7,856,582 | B2 | * | 12/2010 | Cervantes et al. ............ 714/732 |
| 7,992,059 | B2 | * | 8/2011 | Anvekar et al. ............... 714/718 |
| 2003/0009715 | A1 | * | 1/2003 | Ricchetti ................. G11C 29/56 714/727 |
| 2004/0006729 | A1 | * | 1/2004 | Pendurkar ..................... 714/733 |
| 2006/0080585 | A1 | * | 4/2006 | Kiryu ............................. 714/733 |
| 2007/0050693 | A1 | * | 3/2007 | Kiryu ............................. 714/733 |
| 2007/0260823 | A1 | * | 11/2007 | Dickinson et al. ............ 711/153 |
| 2008/0276144 | A1 | * | 11/2008 | Huben et al. .................. 714/733 |
| 2009/0055696 | A1 | * | 2/2009 | Grise et al. .................... 714/725 |
| 2009/0210763 | A1 | * | 8/2009 | Eckelman et al. ............ 714/731 |
| 2010/0262897 | A1 | * | 10/2010 | Miyagawa et al. ........... 714/807 |

OTHER PUBLICATIONS

Liu et al., "Memory Built-in Self Test in Multicore Chips with Mesh-Based Networks," IEEE Micro, 2009, pp. 46-55.
Karimi et al., "Parallel Testing of Multi-Port Static Random Access Memories for BIST," Proceedings of the 2001 IEEE International Symposium on Defect and Fault Tolerance in VLSI Systems, 2001, pp. 1-9.

* cited by examiner

*Primary Examiner* — Albert Decady
*Assistant Examiner* — Enam Ahmed
(74) *Attorney, Agent, or Firm* — Thomas E. Tyson; Gregory K. Goshorn; Greg Goshorn, P.C.

(57) ABSTRACT

Provided is an apparatus that includes a processor comprising a plurality of processing cores and a corresponding plurality of LBIST modules, each LBIST module corresponding to one of the plurality of processing cores; a MISR read out connection, comprising a compare value register, a plurality of MISR registers equal in number to the plurality of cores, each MISR register corresponding to one of the plurality of processing cores and a corresponding plurality of XOR logic gates, each XOR logic gate coupled to the compare value register and a corresponding one of the MISR registers and configured to signal whether or not the event the compare value register and the corresponding MISR register match and logic, stored and executed on the processor, for transmitting the signals generated by the plurality of XOR logic gates.

24 Claims, 4 Drawing Sheets

EVALUATION OF MULTIPLE INPUT SIGNATURE REGISTER RESULTS

FIELD OF DISCLOSURE

The claimed subject matter relates generally to multi-core processors and, more specifically, to techniques for testing individual cores in a multi-core processor.

SUMMARY

As processors and systems on a chip have become more complicated, the number of cores on the devices has increased. An increase in the number of cores has correspondingly increased the complexity of testing procedures. Current design that employ built in self test (BIST) constructs often use multiple input signature registers (MISRs) to collect the results of tests. Typically, use of MISRs involves scanning each MISR of a processor and transmitting the results as a scan chain to a manufacturer test program. The scan chain is then parsed to identify the result from each MISR and the individual results are compared to expected results to determine if the corresponding core has passed or failed the test. As the number of cores have increased, the amount of time required for parsing and comparing has also increased.

Assuming a processor with sixty-four (64) cores, each core having two hundred thousand (200,000) latches, under a worst case scenario, the device has a total of 12.8 million latch bits, each of which must be examined. One modest approach is to connect all the MISRs together in one scan chain. If 32-bit MISRs are used, sixty-four (64) cores would contribute 2048 bits to the scan chain. In current implementations, a pass/fail analysis is performed by software on a manufacturing tester. Of course, there are multiple techniques for arranging a scan chain to facilitate transmitting the chain from a chip being tested. A test pattern, depending upon the particular arrangement technique, is written so that latch locations are identified for each MISR in the scan chain. The manufacturing test then inspects the locations corresponding to each MISR to determine a pass/fail status for a corresponding core.

Provided is an apparatus that includes a processor comprising a plurality of processing cores and a corresponding plurality of LBIST modules, each LBIST module corresponding to one of the plurality of processing cores; a MISR read out connection, comprising a compare value register, a plurality of MISR registers equal in number to the plurality of cores, each MISR register corresponding to one of the plurality of processing cores and a corresponding plurality of XOR logic gates, each XOR logic gate coupled to the compare value register and a corresponding one of the MISR registers and configured to signal whether or not the event the compare value register and the corresponding MISR register match and logic, stored and executed on the processor, for transmitting the signals generated by the plurality of XOR logic gates.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
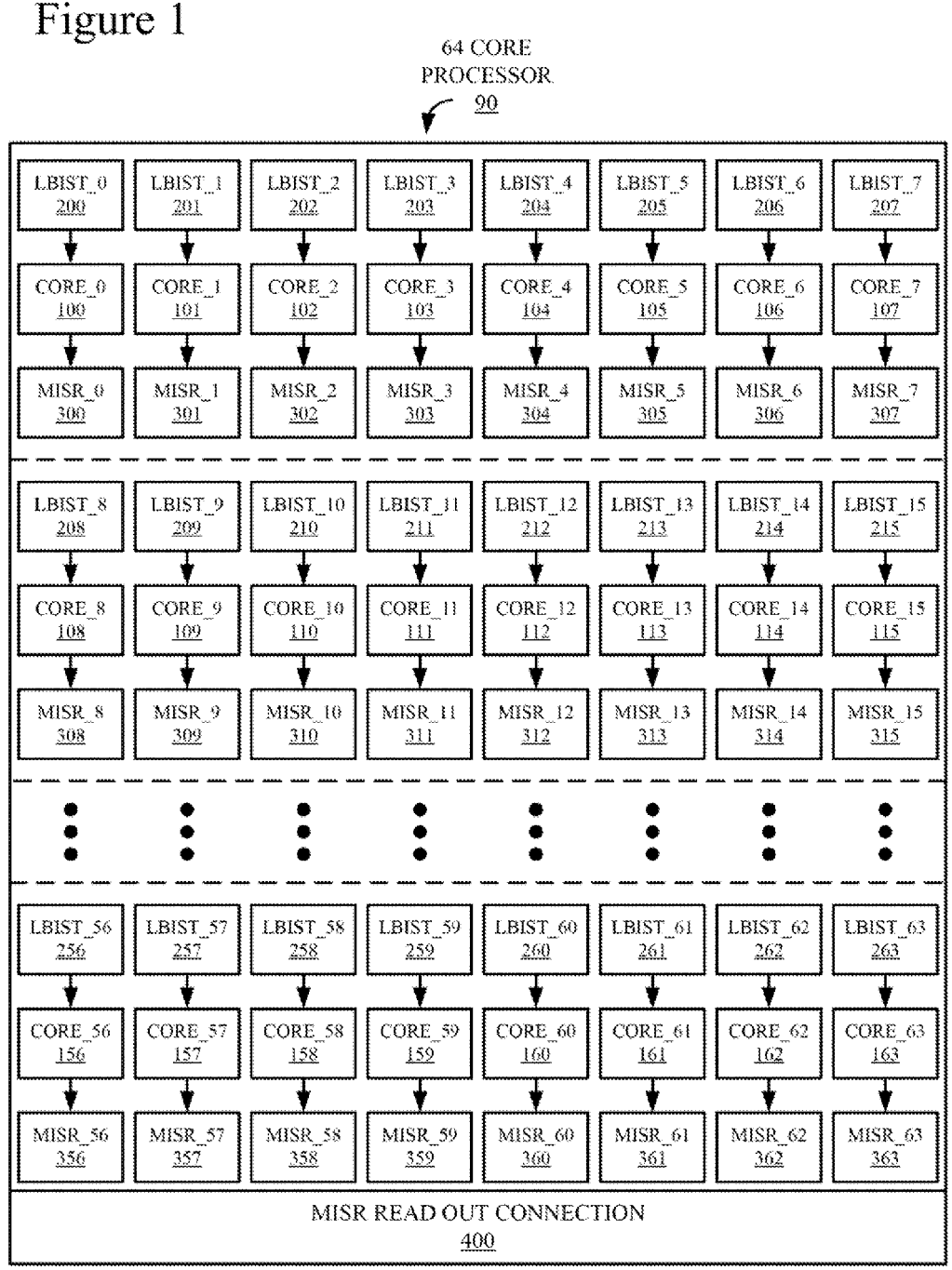
FIG. 1 is a block diagram of a sixty-four (64) core processor that is an example of one implementation of the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for testing multi-core processors. The term "programmed method", as used herein, is defined to mean one or more process steps that are presently performed; or, alternatively, one or more process steps that are enabled to be performed at a future point in time. The term 'programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of a sixty-four (64) core processor 90 that is an example of one implementation of the claimed subject matter. Processor 90 includes sixty-four (64) cores, i.e. a core_0 100, a core_1 101, a core_2 102 and so on up to a core_63 163. For the sake of simplicity only cores 100-115 and 153-163 are illustrated.

Attached to each core 100-163 is a logic built in self test controller (LBIST), i.e. a LBIST_0 200, a LBIST_1 201, a LBIST_2 202 and so on up to a LBIST_63 263, respectively. For the sake of simplicity only LBISTs 200-215 and 253-263 are illustrated. Each of LBISTs 200-263 generates a test pattern for transmission to corresponding core 100-163.

Also coupled to each of cores 100-163 is a multiple input signature register (MISR) 300-363, respectively. Again for the sale of simplicity, only MISRs 300-315 and 356-363 are illustrated. MISRs 300-363 store results corresponding to the operation by cores 100-163, respectively, to the test patterns generated by LBISTs 200-263, respectively. Also coupled to processor 90 is a MISR read out connection 400, which is described in more detail below in conjunction with FIGS. 2-3. It should also be noted that the number of processors, i.e. 64, is arbitrary and used for the purposes of illustration only and that the disclosed techniques are equally applicable to any processor with any number of cores.

Figure 2:
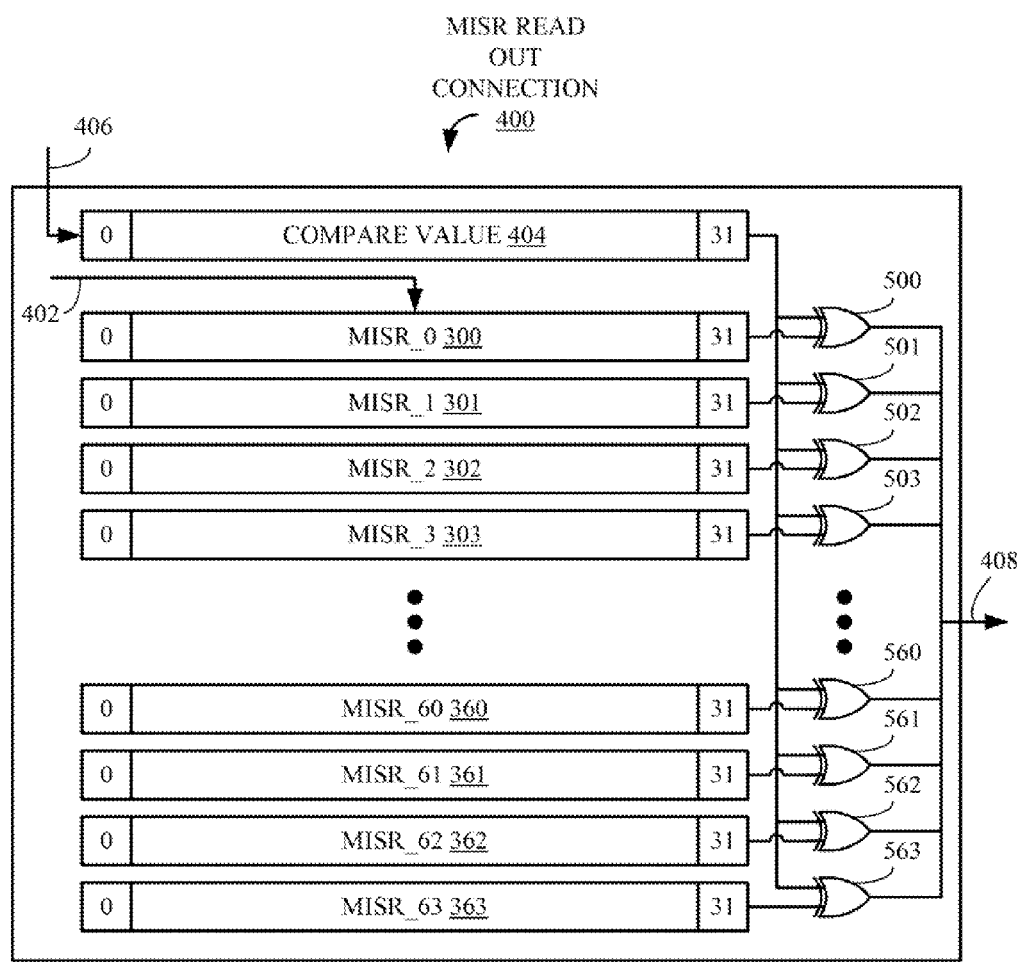
FIG. 2 is a block diagram of a multiple input signature register (MISR) read out connection, first introduced in FIG. 1, in more detail.

FIG. 2 is a block diagram of MISR read out connection 400, first introduced in FIG. 1, in more detail. MISR read out connection 400 includes sixty-four (64) MISRs, which in this example are MISRs 300-363, although for the sake of convenience only MISRs 300-303 and 360-363 are illustrated. In this example, each of MISRs 300-363 includes thirty-two (32) bits of which two are illustrated, i.e. a '0' bit and a '31' bit. It should be noted that FIGS. 1 and 2 represent logical models and that the exact position of particular components within processor 90 is not important. For example, FIG. 1 illustrates MISRs 300-363 logical relationship to cores 100-163 and FIG. 2 illustrates MISRs 300-363 logical relationship to MISR read out connection 400. In addition, although not shown in FIG. 2, each of MISRs 300-363 remains coupled to and receives data from a corresponding core 100-163, respectively, via parallel ports 402, of which, for the sake of simplicity, only the input to MIST 300 is shown.

MISR read out connection 400 also includes a compare value register 404, which, in this example, is thirty-two (32) bits, of which only bit '0' and bit '31' are illustrated. An input 406 to compare register 404 enables a manufacturing tester to set compare register 404 with an expected value. It should be noted different tests may produce different expected results so input 406 is provided to enable the manufacturing tester to match a particular test to an expected result for that particular test. Once LBISTs 200-263 (FIG. 1) have completed a test, results from cores 100-163 (FIG. 1) are accumulated in the corresponding MISRs 300-363.

Scan output of compare value register 402 is coupled to the inputs of sixty-four (64) XOR logic gates 500-563, of which only 500-503 and 560-563 are illustrated. Scan outputs of each of MISRs 300-363 are also coupled to a second input of the corresponding XOR logic gate 500-563. Output of XOR logic gates 500-563 are transmitted via a MISR read out connection output signal 408. The relationships and functions of inputs 402 and 406, output 408, MISRs 300-363, compare value 404 and XOR logic gates 500-563 are explained in more detail below in conjunction with FIGS. 3 and 4.

Figure 3:
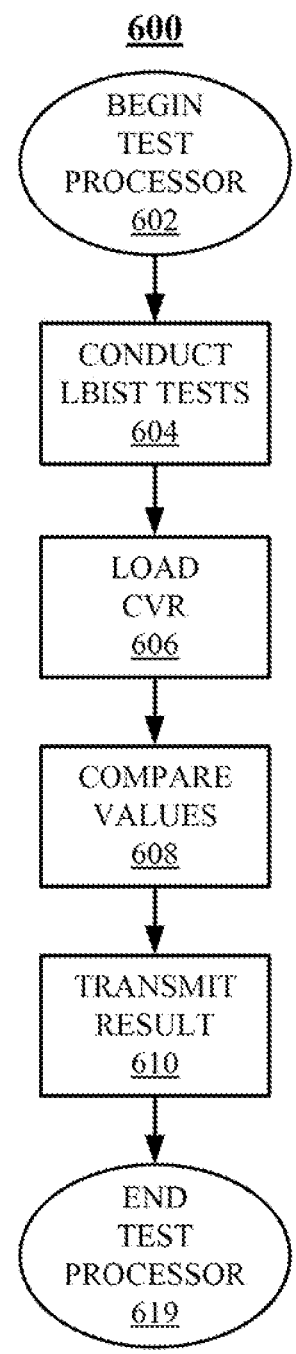
FIG. 3 is a flowchart of a Test Processor process that is executed by the MISR read out connection of FIG. 2.

FIG. 3 is a flowchart of a Test Processor process 600 that is executed by logic associated with processor 90 (FIG. 1) in conjunction with MISR read out connection 400 (FIGS. 1 and 2). Process 600 starts in a "Begin Test Processor" block 602 and proceeds immediately to a "Conduct LBIST tests" block 604. During block 604, each LBIST controller 200-263 (FIG. 1) exercises the logic of the corresponding core 100-163 to produce results that can be compared against expected results. These results are stored as a signature in the corresponding MISR 300-363. During a "Load Compare Value Register (CVR)" block 606, process 600 loads, via input 406 (FIG. 2), an expected result into compare value register 404 (FIG. 2). As explained above in conjunction with FIG. 2, the specific value loaded into register 404 depends upon the particular test conducted by LBISTs 200-263 as different tests will produce different expected results. In this example, since each of cores 100-163 is identical, the expected results will be the same. In another embodiment, cores 100-163 may be several different types with different expected results with logic incorporated into process 600 to sequentially test subsets of cores 100-163 in accordance with the claimed subject matter.

During a "Compare Values" block 608, each of the results generated during block 604 is compared with the value stored in CVR 404 during block 606. The comparisons are executed by logic associated with XOR logic gates 500-563 (FIG. 2), with each gate 500-562 comparing the values in the corresponding MISR 300-363 with the value stored in CVR 404. Output of each XOR logic gate 500-563 is either the value '0', indicated that the corresponding value matches the expected value stored in CVR 404, or the values '1', indicating that the values do not match. A particular core 100-163 that produces a value of '1' from the corresponding gate 500-563 is assumed to be faulty. During a "Transmit Result" block 610 the outputs of XOR logic gates 500-563 are transmitted via MISR read out connection output signal 408 (FIG. 2) to a program that analyses the results (see process 650, FIG. 4). Finally, control proceeds to an "End Test Processor" block 619 in which process 600 is complete.

Figure 4:
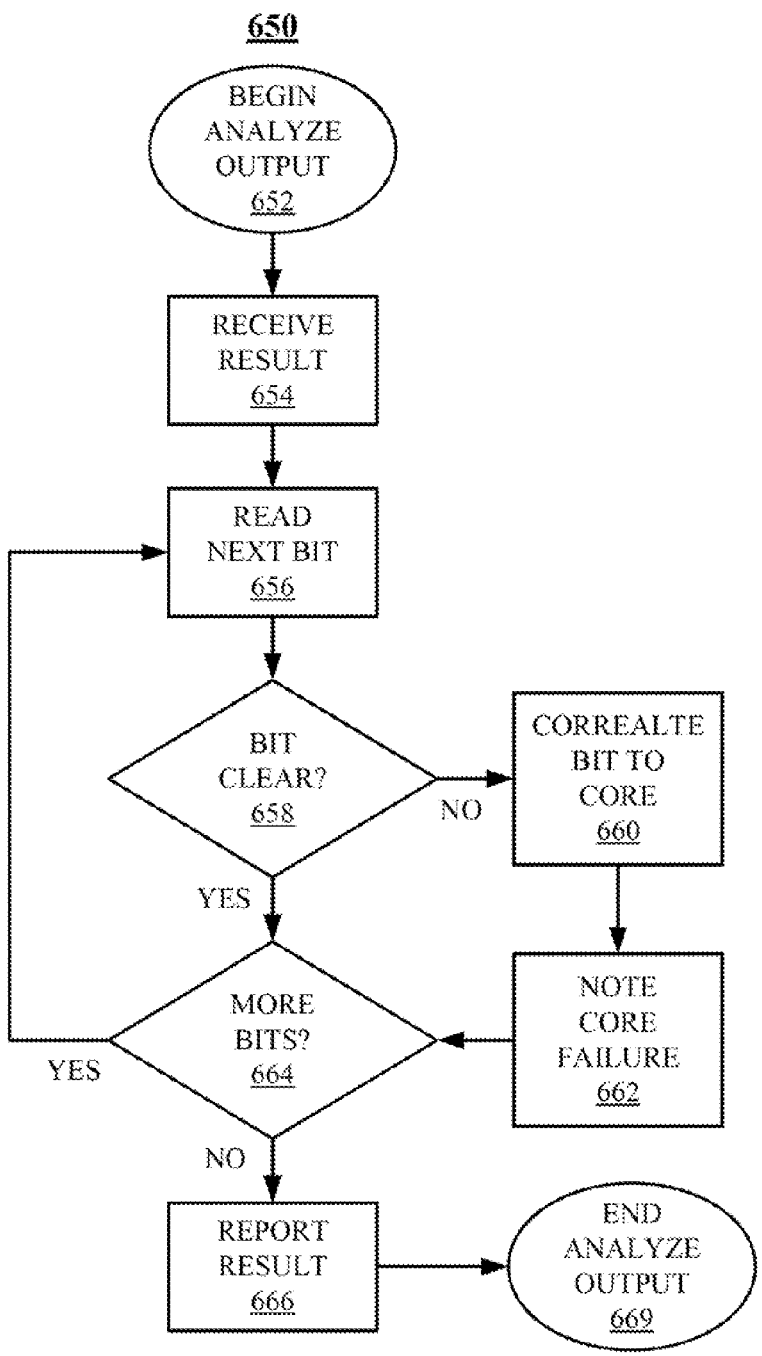
FIG. 4 is a flowchart of an Analyze Output process 650 that may implement aspects of the claimed subject matter.

FIG. 4 is a flowchart of an Analyze Output process 650 that may implement aspects of the claimed subject matter. Typically, logic implementing process 650 is executed by a manufacturing test program (not shown) that may be executed on any suitable computing system. Process 650 starts in a "Begin Analyze Output" block 652 and proceeds immediately to a "Receive Result" block 654. During block 654, process 650 receives the scan chains, representing a test of cores 100-163 (FIG. 1), transmitted from MISR read out connection 400 (FIGS. 1 and 2) (see 612, FIG. 3). During a "Read Next Bit" block 656, process 650 examines, during the entry into block 656, the first bit in the scan chain received during block 654.

During a "Bit Clear?" block 658, process 650 determines whether or not the bit read during block 656 is clear, i.e. set to a value of '0', or not, i.e. set to a value of '1'. If the bit is not clear, control proceeds to a "Correlate Bit to Core" block 660 during which process 650 determines the place of the bit in the scan chain to determine the corresponding core 100-163 that produced the value. During a "Note Core Failure" block 662, process 650 notes that the core identified during block 660 is defective.

Once the defective core has been noted during block 662 or, once the read bit has been evaluated to have a value of '0' during block 658, control proceeds to a "More Bits?" block 664 during which process 650 determines whether or not every bit in the scan chain received during block 654 has been examined. If there are more bits to examine, control returns to Read Next Bit block 656 during which the next unexamined bit is read and processing continues as described above. If, during block 664, process 650 determines that each bit has been examined, control proceeds to a "Report Results" block 666 during which process 650 repots to an appropriate entity the results noted during 662, which include indications of each core 100-163 that failed the test.

Finally control proceeds to an "End Analyze Output" block 669 in which process 650 is complete. In this manner, rather than producing a scan chain comprised of sixty-four (64) times thirty-two (32) bits with each thirty-two bit scan chains corresponding to one of cores 100-163 (FI), the disclosed technology produces, in this example, a thirty-two (32) bit scan chain for analysis. Advantages of this approach include a simple design with a low area requirement by incorporating one XOR logic gate 500-563 per MISR 300-363. The time to test processor 90 is also minimized because only thirty-two (32) scan clocks (not shown) are required to determine the health of sixty-four (64) cores 100-163. The width of a MISR 300-363 determines the number of scan clocks needed. In addition, a minimum manufacturing test program is required because test logic merely needs to look at the scan chain transmitted during block 612 for values of '1' on an output pin (not shown) to identify a failed core 100-163. The design is also scalable because, although the example shows sixty-four (64) cores 100-163, the disclosed techniques may be applied to any number of cores.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I claim:

1. An apparatus, comprising:
a processor comprising:
a plurality of two or more processing cores; and
a corresponding plurality of logic built in self test (LBIST) controllers, each LBIST controller corresponding to one of the plurality of processing cores, wherein each LBIST controller is configured to transmit a test signal to the corresponding processing core in parallel with each other LBIST controller;
a multiple input signature register (MISR) read out connection, comprising:
a compare value register;
a plurality of MISR registers equal in number to the plurality of cores, each MISR register corresponding to one of the plurality of processing cores and configured to store one of a plurality of results, each result generated and transmitted in parallel by the corresponding processing core in response to the corresponding test signal; and
a corresponding plurality of XOR logic gates, each XOR logic gate coupled to the compare value register via a corresponding first input on each XOR logic gate, each XOR logic gate coupled to a corresponding one of the MISR registers via a corresponding second input on each XOR logic gate and each XOR logic gate configured to signal whether or not the event the compare value register and the corresponding stored result match; and
logic, stored and executed on the processor, for transmitting the signals generated by the plurality of XOR logic gates via a single scan chain, wherein a number of bits in the scan chain equals the number of processing cores.

2. The apparatus of claim 1, further comprising logic for evaluating each of the plurality of processing cores based upon the signals generated by the plurality of XOR logic gates.

3. The apparatus of claim 1, wherein the signals generated by the plurality of XOR logic gates are each one bit.

4. The apparatus of claim 3, the logic further comprising logic for signaling an indication that a particular processing core of the plurality of processing cores is defective if a corresponding bit from the corresponding XOR logic gate is set.

5. The apparatus of claim 1, wherein the test signal is a particular test signal of a plurality of test signals, each test signal corresponding to one of a plurality of signatures; and further comprising logic for loading the compare value register with a signature of the plurality of signatures corresponding to the particular test signal.

6. The apparatus of claim 1, further comprising a manufacturer tester that executes the logic for evaluating each of the plurality of processing cores.

7. A computing system, comprising:
a non-transitory computer-readable storage medium; and
a processor, the processor comprising:
a plurality of two or more processing cores; and
a corresponding plurality of logic built in self test (LBIST) controllers, each LBIST controller corresponding to one of the plurality of processing cores, wherein each LBIST controller is configured to transmit a test signal to the corresponding processing core in parallel with each other LBIST controller;
a multiple input signature register (MISR) read out connection, comprising:
a compare value register;
a plurality of MISR registers equal in number to the plurality of cores, each MISR register corresponding to one of the plurality of processing cores and configured to store one of a plurality of results, each result generated and transmitted in parallel by the corresponding processing core in response to the corresponding test signal; and
a corresponding plurality of XOR logic gates, each XOR logic gate coupled to the compare value register via a corresponding first input on each XOR logic gate, each XOR logic gate coupled to a corresponding one of the MISR registers via a corresponding second input on each XOR logic gate and each XOR logic gate to signal whether or not the event the compare value register and the corresponding stored result match; and
logic, stored and executed on the processor, for transmitting the signals generated by the plurality of XOR logic gates via a single scan chain, wherein a number of bits in the scan chain equals the number of processing cores.

8. The computing system of claim 7, further comprising logic for evaluating each of the plurality of processing cores based upon the signals generated by the plurality of XOR logic gates.

9. The computing system of claim 7, wherein the signals generated by the plurality of XOR logic gates are each one bit.

10. The computing system of claim 9, the logic further comprising logic for signaling an indication that a particular processing core of the plurality of processing cores is defective if a corresponding bit from the corresponding XOR logic gate is set.

11. The computing system of claim 7, wherein the test signal is a particular test signal of a plurality of test signals, each test signal corresponding to one of a plurality of signatures; and further comprising logic for loading the compare value register with a signature of the plurality of signatures corresponding to the particular test signal.

12. The computing system of claim 7, further comprising a manufacturer tester that executes the logic for evaluating each of the plurality of processing cores.

13. A manufacturer tester, comprising:
a non-transitory computer-readable storage medium; and
a processor, the processor comprising logic for receiving a plurality of test signals in parallel, each signal from one of a plurality of XOR logic gates,
wherein each XOR logic gate is coupled to a compare value register via a corresponding first input on each XOR logic gate, each XOR logic gate coupled to a corresponding one of the MISR registers via a corresponding second input on each XOR logic gate, each MISR register coupled to a corresponding processing core of a plurality of two or more processing cores; and
wherein each XOR logic gate is configured to transmit a signal, via a single scan chain, wherein a number of bits in the scan chain equals the number of processing cores, in parallel with each XOR logic gate to the processor indicating whether or not the compare value register and values stored in the plurality of MISR registers match.

14. The manufacturer tester of claim 13, further comprising logic for evaluating each of the plurality of processing cores based upon the plurality of test signals transmitted by the plurality of XOR logic gates.

15. The manufacturer tester of claim 13, wherein each of the plurality of test signals transmitted by the plurality of XOR logic gates is one bit.

16. The manufacturer tester of claim 15, the logic further comprising logic for signaling an indication that a particular processing core of the plurality of processing cores is defective if a corresponding bit from the corresponding XOR logic gate is set.

17. The manufacturer tester of claim 13, wherein the test signal is a particular test signal of a plurality of test signals, each test signal corresponding to one of a plurality of signatures; and further comprising logic for loading the compare value register with a signature of the plurality of signatures corresponding to the particular test signal.

18. A method, comprising:
transmitting a test signal from a plurality of logic built in self test (LBIST) controllers, each LBIST controller corresponding to one of the plurality of two or more processing cores, wherein each LBIST controller is configured to transmit the test signal to the corresponding processing core in parallel with each other LBIST controller;
processing the test signal in each of the processing cores to produce a plurality of signature values, each signature value corresponding to one processing core of the plurality of processing cores;
loading an expected signature value into a compare value register;
transmitting in parallel, to a plurality of XOR logic gates, wherein each gate corresponds to a processing core of the plurality of processing cores, the expected signature value, via a corresponding first input on each XOR logic gate, and a corresponding signature value of the plurality of signature values, via a corresponding second input on each XOR logic gate;
transmitting, from each XOR logic gate, a corresponding result signal based upon the expected signature value and the corresponding signature value via a single scan chain, wherein a number of bits in the scan chain equals the number of processing cores.

19. The method of claim 18, evaluating each of the result signals to determine a status corresponding to each processing core.

20. The method of claim 18, wherein the result signals are each one bit.

21. The method of claim 20, further comprising determining that a processing core is defective if the corresponding result signal is set.

22. The method of claim 18, wherein the test signal is a particular test signal of a plurality of test signals, each test signal corresponding to one of a plurality of expected signatures; and wherein the compare value register is loaded with an expected signal, of the plurality of expected signals, that corresponds to the test signal.

23. The method of claim 18, wherein a manufacturer tester evaluates the result signals.

24. An apparatus, comprising:
a processor comprising:
a plurality of two or more processing cores; and
a corresponding plurality of logic built in self test (LBIST) controllers, each LBIST controller corresponding to one of the plurality of processing cores, wherein each LBIST controller is configured to transmit a test signal to the corresponding processing core in parallel with each other LBIST controller;
a multiple input signature register (MISR) read out connection, comprising:
a compare value register;
a plurality of MISR registers equal in number to the plurality of cores, each MISR register corresponding to one of the plurality of processing cores and configured to store one of a plurality of results, each result generated and transmitted in parallel by the corresponding processing core in response to the corresponding test signal; and
a corresponding plurality of XOR logic gates, each XOR logic gate coupled to the compare value register via a corresponding first input on each XOR logic gate, each XOR logic gate coupled to a corresponding one of the MISR registers via a corresponding second input on each XOR logic gate and each XOR logic gate configured to signal whether or not the event the compare value register and the corresponding stored result match; and
logic, stored and executed on the processor, for:
transmitting the signals generated by the plurality of XOR logic gates via a single scan chain, wherein a number of bits in the scan chain equals the number of processing cores;
evaluating each of the plurality of processing cores based upon the signals generated by the plurality of XOR logic gates, wherein the signals generated by the plurality of XOR logic gates are each one bit; and
signaling an indication that a particular processing core of the plurality of processing cores is defective if a corresponding bit from the corresponding XOR logic gate is set;
wherein the test signal is a particular test signal of a plurality of test signals, each test signal corresponding to one of a plurality of signatures; and further comprising logic for loading the compare value register with a signature of the plurality of signatures corresponding to the particular test signal.

* * * * *